(12) United States Patent
Eun et al.

(10) Patent No.: US 12,111,647 B2
(45) Date of Patent: Oct. 8, 2024

(54) METHOD AND APPARATUS FOR ESTIMATING DISTURBANCE OF CONTROL SYSTEM BASED ON INPUT/OUTPUT DATA

(71) Applicant: DAEGU GYEONGBUK INSTITUTE OF SCIENCE AND TECHNOLOGY, Daegu (KR)

(72) Inventors: Yongsoon Eun, Daegu (KR); Juseung Lee, Cheongju-si (KR); Jaeho Lee, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 420 days.

(21) Appl. No.: 17/553,951

(22) Filed: Dec. 17, 2021

(65) Prior Publication Data
US 2023/0029159 A1 Jan. 26, 2023

(30) Foreign Application Priority Data
Jul. 22, 2021 (KR) .................. 10-2021-0096441

(51) Int. Cl.
G05B 23/02 (2006.01)
G06F 17/16 (2006.01)
(52) U.S. Cl.
CPC ........... *G05B 23/024* (2013.01); *G06F 17/16* (2013.01)
(58) Field of Classification Search
CPC ............................ G05B 23/024; G06F 17/16
USPC ........................................................ 700/100
See application file for complete search history.

(56) References Cited

U.S. PATENT DOCUMENTS

| | | | | |
|---|---|---|---|---|
| 6,094,602 A | * | 7/2000 | Schade, III | G05B 11/42 700/44 |
| 2005/0096793 A1 | * | 5/2005 | Takeuchi | G05B 13/047 700/245 |
| 2008/0221710 A1 | * | 9/2008 | Brunell | G05B 5/01 700/45 |
| 2022/0027726 A1 | * | 1/2022 | Yamashita | A61B 3/113 |
| 2022/0058312 A1 | * | 2/2022 | Iwata | G06F 17/10 |
| 2022/0188401 A1 | * | 6/2022 | Kanai | G05B 23/0237 |

FOREIGN PATENT DOCUMENTS

| | | |
|---|---|---|
| KR | 1998-0004823 | 3/1998 |
| KR | 10-2005-0085225 | 8/2005 |
| KR | 10-2018-0065942 | 6/2018 |
| KR | 10-2019-0010787 | 1/2019 |

OTHER PUBLICATIONS

KIPO, Office Action of the corresponding Korean Patent Application No. 10-2021-0096441 dated May 24, 2023.
Markovsky, Ivan, et al. "Data driven simulation with applications to system identification." IFAC Proceedings vols. 38.1 (2005): 970-975.

* cited by examiner

*Primary Examiner* — Md Abul Azad
(74) *Attorney, Agent, or Firm* — LEX IP MEISTER, PLLC

(57) ABSTRACT

Disclosed is an apparatus for estimating disturbance flowing into a control system on the basis of input/output data. The apparatus includes an input unit, and an estimator configured to, when input data (u) is provided to the control system through the input unit and thus output data is acquired, estimate the input data (u) from the acquired output data, based on a system model matrix corresponding to an input/output relation model of the control system. Accordingly, efficiency of the apparatus may be improved.

8 Claims, 8 Drawing Sheets

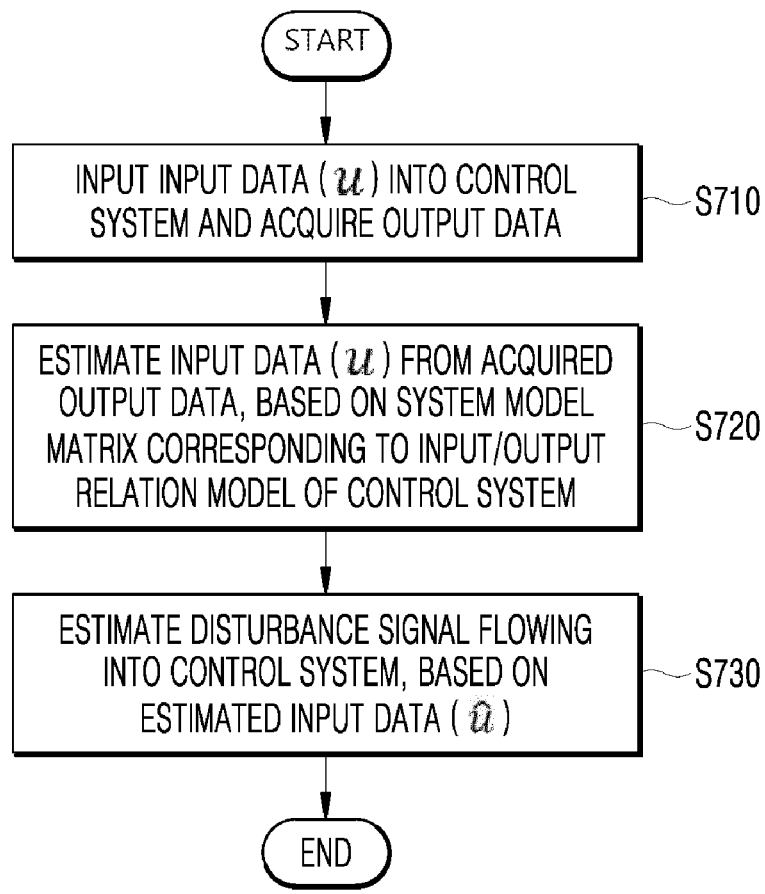

METHOD AND APPARATUS FOR ESTIMATING DISTURBANCE OF CONTROL SYSTEM BASED ON INPUT/OUTPUT DATA

CROSS-REFERENCE TO RELATED APPLICATION

This present application claims the benefit of priority to Korean Patent Application No. 10-2021-0096441, entitled "METHOD AND APPARATUS TO ESTIMATE DISTURBANCE OF CONTROL SYSTEM BASED ON INPUT/OUTPUT DATA," filed on Jul. 22, 2021, in the Korean Intellectual Property Office, the entire disclosure of which is incorporated herein by reference.

BACKGROUND OF THE INVENTION

1. Field of the Invention

The present disclosure relates to a method of estimating a disturbance signal flowing into a control system on the basis of input/output data and an apparatus for estimating the disturbance signal using the same and compensating for the estimated disturbance signal.

2. Description of the Prior Art

The following description is only to provide background information related to embodiments of the present disclosure and does not necessarily constitute prior arts.

Disturbance may flow into a control system from the outside. The disturbance may deteriorate the performance of the system or make the system unstable as the case may be.

Accordingly, it is important to accurately estimate a disturbance signal flowing into the control system and compensate for the disturbance. In order to estimate and compensate for the disturbance signal, a disturbance observer (DOB) may be applied.

A conventional disturbance observer needs system modeling for the control system and particularly, any systematic approach is unknown to design DOB for multiple input multiple output.

Therefore, it is required to remove limitations on the conventional disturbance observer.

Meanwhile, the aforementioned prior arts are technical information that the inventor possessed to derive the present disclosure or acquired during a process of deriving the present disclosure, but are not necessarily prior arts known to the public before the present disclosure is filed.

SUMMARY OF THE INVENTION

An aspect of the present disclosure is to provide an apparatus for configuring input/output data in a matrix form without mathematical modeling for a control system to estimate a disturbance signal and compensate for the estimated disturbance signal.

Another aspect of the present disclosure is to provide a method of observing a disturbance signal based on input/output data without the application of a low pass filter.

The technical problems to be solved by the present disclosure are not limited to the above mentioned technical problems, and other technical problems that are not mentioned may be clearly understood by those skilled in the art of the present disclosure on the basis of the following descriptions.

In order to solve the problems, a method of estimating disturbance flowing into a control system, based on input/output data according to an embodiment includes inputting input data (u) into the control system and acquiring output data, estimating the input data (u) from the acquired output data, based on a system model matrix corresponding to an input/output relation model of the control system, and estimating a disturbance signal flowing into the control system, based on the estimated input data (û).

An apparatus for estimating disturbance flowing into a control system, based on input/output data according to an embodiment of the present disclosure includes an input unit, and an estimator configured to, when input data (u) is provided to the control system through the input unit and thus output data is acquired, estimate the input data (u) from the acquired output data, based on a system model matrix corresponding to an input/output relation model of the control system. The estimator may be configured to estimate a disturbance signal flowing into the control system, based on the estimated input data (û).

Subjects of the technical problems to be solved by the present disclosure may not be limited to the above mentioned technical subjects, and other technical subjects which are not mentioned may be clearly understood by those skilled in the art of the present disclosure on the basis of the following descriptions.

According to various embodiments of the present disclosure, it is possible to, even though system modeling is not performed, accurately estimate a disturbance signal applied to a control system, compensate for the estimated disturbance signal to improve device efficiency, and protect the control system. Further, it is possible to efficiently configure the device to observe a disturbance signal based on input/output data.

The effects of the present disclosure are not limited to the above-described effects, and other effects that have not been mentioned may be clearly understood by those skilled in the art of the present disclosure on the basis of the following descriptions.

BRIEF DESCRIPTION OF THE DRAWINGS

FIG. 8 is a sequence diagram illustrating a method of estimating a disturbance signal flowing into the control system according to an embodiment of the present disclosure.

DETAILED DESCRIPTION OF THE EXEMPLARY EMBODIMENTS

Figure 1:
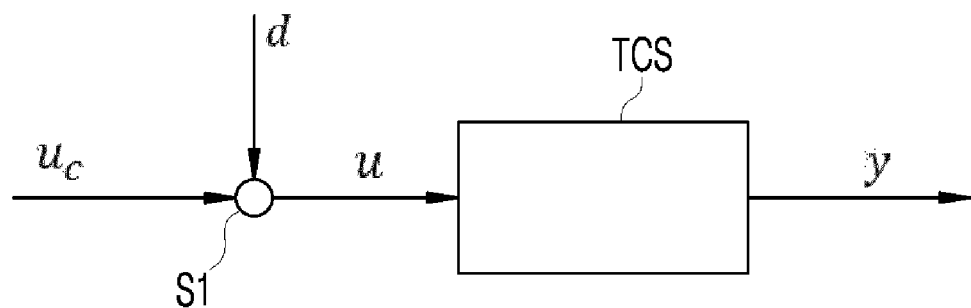
FIG. 1 is a diagram illustrating a disturbance signal flowing into a control system.

Hereinafter, the present disclosure is described in more detail with reference to the accompanying drawings. The present disclosure may be implemented in various different forms and is not limited to embodiments described herein. In the following embodiments, parts that are not directly related to the description are omitted for clear description, but it does not mean that the omitted parts are not necessary to implement an apparatus or a system to which the idea of the present disclosure is applied. Throughout the specification, the same or similar reference numerals are used for the same or similar elements.

In the following description, the terms such as first, second, and the like can be used to describe various elements, but the elements should not be limited by the terms, and the terms are used only to distinguish one element from other elements. Further, in the following description, the singular includes plurals unless the context is clearly stated.

In the following description, the terms "include", "have", or the like is intended to indicate that characteristics, numbers, steps, operations, elements, or components disclosed on the specification or a combination thereof exists. Rather, the terms "include" or "have" should be understood so as not to pre-exclude the existence or additionality of one or more other characteristics, numbers, steps, operations, elements, components, or a combination thereof.

FIG. 1 is a diagram illustrating a disturbance signal flowing into a control system (TCS).

The control system (TCS) may be a system for receiving a control signal and outputting the control signal and may include various sensors. In an optional embodiment, the control system (TCS) may be a discrete time system, and system modeling of the control system (TCS) may be difficult or impossible. A system model may include parameters and/or an algorithm for explaining a characteristic, an operation, and the like of the control system (TCS).

Initial input data ($u_c$) may be converted into input data (u) by inflow of a disturbance signal (d) due to disturbance (or breakdown) at a first point (S1) and may be input into the control system (TCS).

In this case, the control system (TCS) may output output data (y), which is not expected, due to inflow of the data (d), which is not intended.

A disturbance signal estimation device (100 in FIG. 2) according to an embodiment of the present disclosure may accurately estimate the disturbance signal (d) flowing into the control system (TCS).

Figure 2:
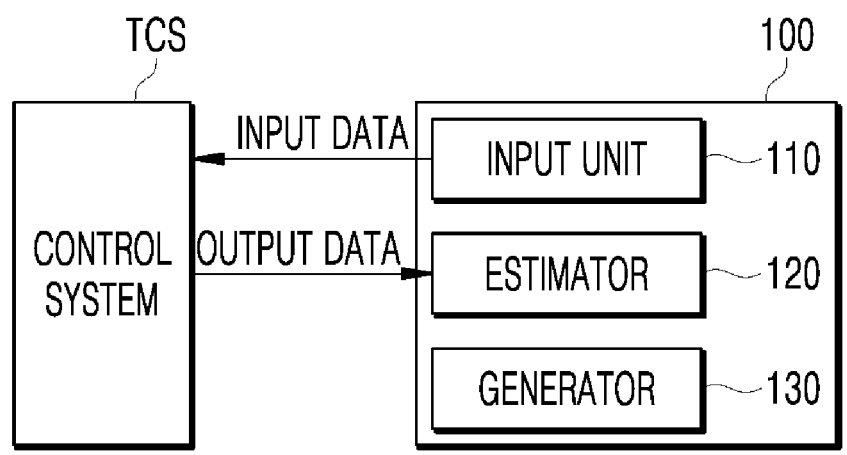
FIG. 2 is a block diagram illustrating the configuration of a disturbance signal estimation device according to an embodiment of the present disclosure.

Hereinafter, the configuration and operation of the disturbance signal estimation device 100 is described with reference to FIG. 2 and FIG. 3. FIG. 2 is a block diagram illustrating the configuration of the disturbance signal estimation device 100 according to an embodiment of the present disclosure, and FIG. 3 is a control sequence diagram illustrating the operation of the disturbance signal estimation device 100 according to an embodiment of the present disclosure.

Figure 3:
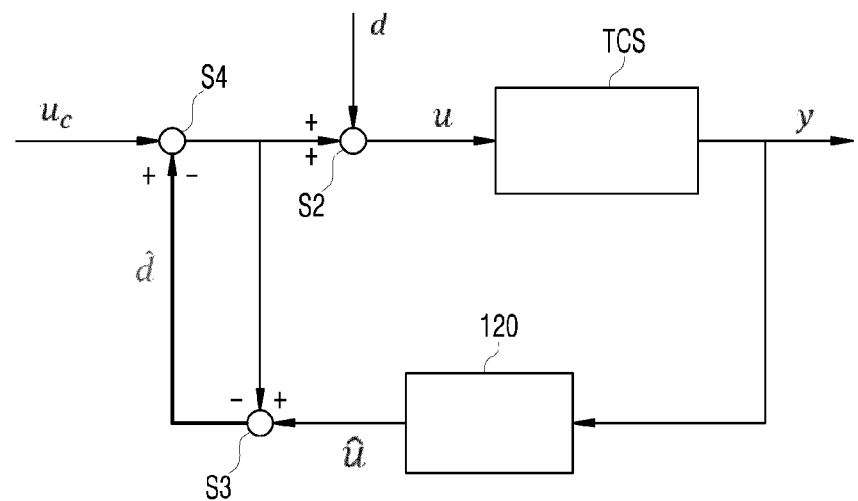
FIG. 3 is a control sequence diagram illustrating the operation of the disturbance signal estimation device according to an embodiment of the present disclosure.

In description of FIG. 2 and FIG. 3, the description focuses on estimation of the disturbance signal by the disturbance signal estimation device 100. However, in an optional embodiment, the disturbance signal estimation device 100 may further include an element configured to compensate for the estimated disturbance signal.

The disturbance signal estimation device 100 may include an input unit 110, an estimator 120, a generator 130, and the like. In an optional embodiment, the disturbance signal estimation device 100 may include more elements or fewer elements.

The input unit 110 may input initial input data ($u_c$), which is not initially influenced by disturbance, into the control system (TCS) (or input may be intended). However, input data (u) into which the disturbance signal (d) flows may be input into the control system (TCS).

In an optional or additional embodiment, the input data (u) may be the same as the initial input data ($u_c$) into which the disturbance signal (d) has not flowed. However, in the specifications, it is mainly described that the input data (d) is data into which the disturbance signal (d) flows.

The input data (u) is provided to the control system (TCS) through the input unit 110, and thus the estimator 120 may acquire output data (y).

The estimator 120 may estimate the input data (u) from the acquired output data (y) on the basis of a system model matrix corresponding to an input/output relation model of the control system (TCS), and output estimated input data ($\hat{u}$).

The estimator 120 may estimate the disturbance signal (d) flowing into the control system (TCS) on the basis of the estimated input data ($\hat{u}$). The estimated disturbance signal may be expressed as $\hat{d}$.

In an optional embodiment, the estimator 120 may subtract the estimated disturbance signal $\hat{d}$ from the following input data input into the control signal (TCS) and reflect the input data.

The estimator 120 may estimate the disturbance signal by comparing the estimated input data ($\hat{u}$) and the initial input data ($u_c$) which is not influenced by disturbance.

Specifically, since an equation is $\hat{u}=u_c+d-\hat{d}$ established, [Reference equation 1] below may be established.

$$\hat{d}=\hat{u}-(u_c-\hat{d})=u_c+d-\hat{d}-(u_c-\hat{d})=d$$

That is, the estimated disturbance signal is ($\hat{d}$) the same as the flowing disturbance signal (d).

The generator 130 may generate a system model matrix of the control system (TCS).

The system model matrix may include two reference sampling matrixes ($U_p$, $U_f$) obtained by dividing a series of input sampling data input into the control system (TCS) according to the number of pieces of data and two reference sampling matrixes ($Y_p$, $Y_f$) obtained by dividing a series of output sampling data output from the control system (TCS) according to the number of pieces of data in accordance with the series of input sampling data. The reference sampling matrixes ($U_p$, $U_f$, $Y_p$, $Y_f$) may be obtained through a sampling process. The sampling process is described with reference to FIG. 4.

Figure 4:
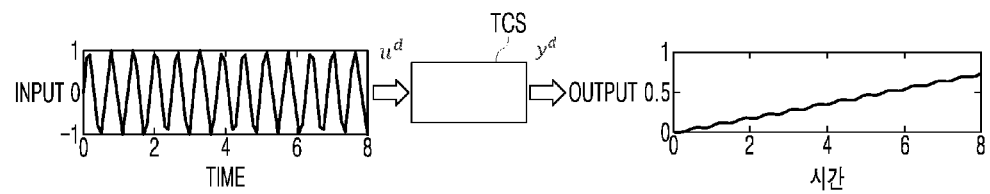
FIG. 4 is a diagram illustrating a process for generating a reference sampling matrix according to an embodiment of the present disclosure.

FIG. 4 is a diagram illustrating a process of generating reference sampling matrixes ($U_p$, $U_f$, $Y_p$, $Y_f$) according to an embodiment of the present disclosure.

First, a series of input sampling data ($u^d$) may be noise, well-mixed data, or a sinusoidal signal, but an embodiment is not limited thereto.

A series of output sampling data ($y^d$) is data that is output in consequence of the input of the series of input sampling data ($u^d$) into the control system (TCS), and may have various output forms according to the control system (TCS).

The reference sampling matrixes ($U_p$, $U_f$, $Y_p$, $Y_f$) may be configured as follows.

$$U_p = \begin{bmatrix} u^d(1) & u^d(2) & \ldots & u^d(T-N-T_{ini}+1) \\ u^d(2) & u^d(3) & \ldots & u^d(T-N-T_{ini}+2) \\ \vdots & \vdots & \ddots & \vdots \\ u^d(T_{ini}) & u^d(T_{ini}+1) & \ldots & u^d(T-N) \end{bmatrix}$$

-continued $$Y_p = \begin{bmatrix} y^d(1) & y^d(2) & \cdots & y^d(T-N-T_{ini}+1) \\ y^d(2) & y^d(3) & \cdots & y^d(T-N-T_{ini}+2) \\ \vdots & \vdots & \ddots & \vdots \\ y^d(T_{ini}) & y^d(T_{ini}+1) & \cdots & y^d(T-N) \end{bmatrix}$$

$$U_f = \begin{bmatrix} u^d(T_{ini}+1) & u^d(T_{ini}+2) & \cdots & u^d(T-N+1) \\ u^d(T_{ini}+2) & u^d(T_{ini}+3) & \cdots & u^d(T-N+2) \\ \vdots & \vdots & \ddots & \vdots \\ u^d(T_{ini}+N) & u^d(T_{ini}+N+1) & \cdots & u^d(T) \end{bmatrix}$$

$$Y_f = \begin{bmatrix} y^d(T_{ini}+1) & y^d(T_{ini}+2) & \cdots & y^d(T-N+1) \\ y^d(T_{ini}+2) & y^d(T_{ini}+3) & \cdots & y^d(T-N+2) \\ \vdots & \vdots & \ddots & \vdots \\ y^d(T_{ini}+N) & y^d(T_{ini}+N+1) & \cdots & y^d(T) \end{bmatrix}$$

The total number of samplings is T, and the reference sampling matrixes ($U_p$, $U_f$, $Y_p$, $Y_f$) may satisfy the following condition.

The corresponding condition is $U_p \in R^{n,T_{ini}}$, $Y_p \in R^{m,N}$, $U_f \in R^{n,T_{ini}}$, $Y_f \in R^{m,N}$. $T_{ini}$ and N are all numbers related to rows, the reference sampling matrixes ($U_p$, $U_f$, $Y_p$, $Y_f$) may be implemented as a Hankel matrix, and data according to the passage of time may be divided and expressed for each row.

The estimator 120 may estimate the input data (u) on the basis of [Equation 1] and [Equation 2] below.

$$\begin{bmatrix} Y_p \\ U_p \\ Y_f \end{bmatrix} g = \begin{bmatrix} y_{ini} \\ u_{ini} \\ y \end{bmatrix} \qquad \text{[Equation 1]}$$

$$U_f \cdot g = \hat{u} \qquad \text{[Equation 2]}$$

In [Equation 1] and [Equation 2], g denotes a predetermined variable and may be derived by [Equation 1], $u_{ini}$ denotes an additional input data matrix, and $y_{ini}$ denotes an additional output data matrix. In both $u_{ini}$ and $y_{ini}$, $T_{ini}$ pieces of data may be included in each row. u is acquired output data and may be expressed as a plurality of rows according to the number of rows in the left side. At this time, the number of corresponding rows may be $T_{ini}+N$. $\hat{u}$ denotes estimated input data.

Referring back to FIG. 2 and FIG. 3, respective points (S2, S3, S4) indicate logical control flow in which signals overlap, and + or − marked on the right side of the arrow is an item required for calculations.

As described above, the disturbance signal compensation device 100 according to an embodiment of the present disclosure may be implemented based on input/output data, without any low pass filter, and may estimate a disturbance signal using a system model matrix corresponding to an input/output relation model without mathematical modeling for the system configuration of the control system (TCS) and further compensate for the disturbance signal.

Figure 5:
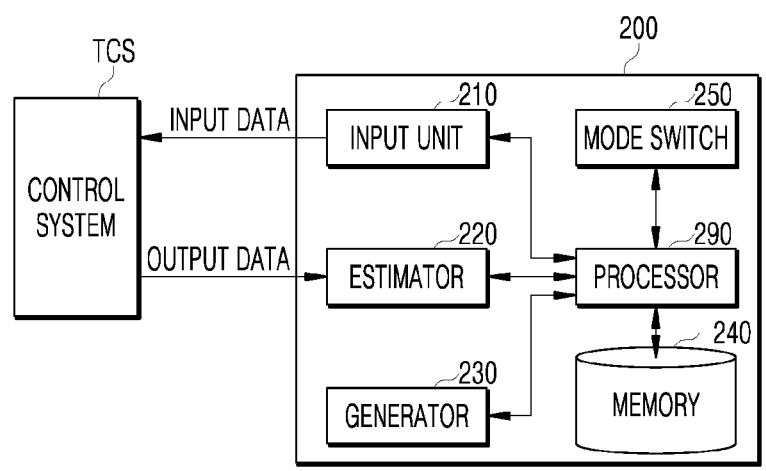
FIG. 5 is a block diagram illustrating the configuration of a disturbance signal compensation device according to an embodiment of the present disclosure.

FIG. 5 is a block diagram illustrating the configuration of a disturbance signal compensation device 200 according to an embodiment of the present disclosure.

The disturbance signal compensation device 200 may include the disturbance signal estimation device 100 of FIG. 2 and FIG. 3 and may further include the memory 240, the mode switch 250, and at least one processor 290. Since the input unit 210, the estimator 220, and the generator 230 are the same as the above-described disturbance signal estimation device 100, a detailed description thereof is omitted.

The memory 240 may store various pieces of information and various pieces of modeling information.

The mode switch 250 may change a first mode for estimating the disturbance signal and a second mode for compensating for the estimated signal.

The number of processors 290 may be one or more, and even though the processor is expressed by a singular form, the number of processors may be considered to be plural. The processor 290 is a module for controlling each element, and may refer to a data processing device, which has a physically structured circuit to perform a function represented by a code or a command included in a program and is embedded into hardware. For example, the data processing device embedded into hardware may include processing devices such as a microprocessor, a Central Processing Unit (CPU), a processor core, a multiprocessor, an Application-Specific Integrated Circuit (ASIC), a Field Programmable Gate Array (FPGA), and the like, but the scope of the present disclosure is not limited thereto. The processor 290 may separately include a learning processor configured to perform an artificial intelligence operation or may have a learning processor therein.

When the disturbance signal is generated in the first mode, the processor 290 may control the mode switch 250 to operate in the second mode.

When the disturbance signal is estimated, the processor 290 may control the input unit 210 to reflect subtraction of the estimated disturbance signal in the following input data of the control system (TCS).

FIG. 6A to FIG. 7D are diagrams illustrating the disturbance signal compensation device 200 for compensating for a disturbance signal generated according to an embodiment of the present disclosure.

Figure 6A:
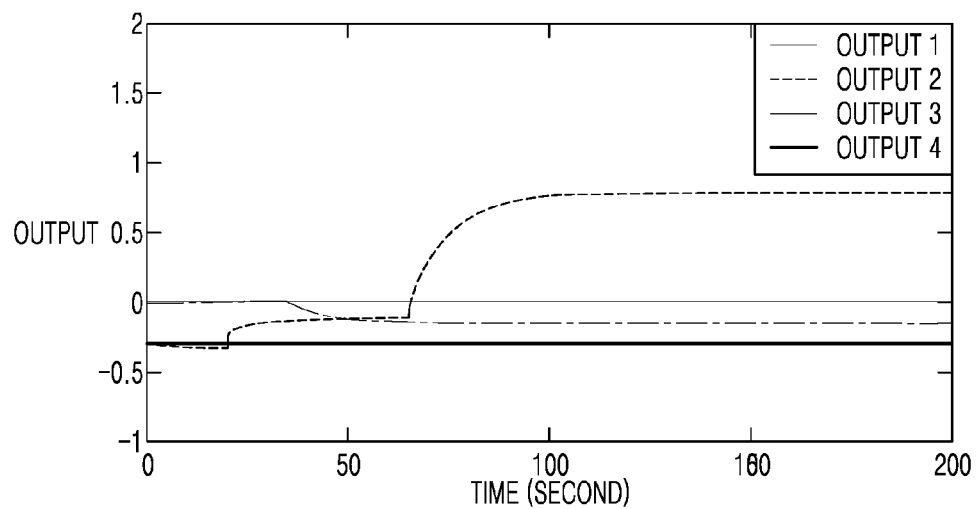
FIG. 6A to FIG. 7D are diagrams illustrating the disturbance signal compensation device for compensating for a generated disturbance signal according to an embodiment of the present disclosure.
Figure 6B:
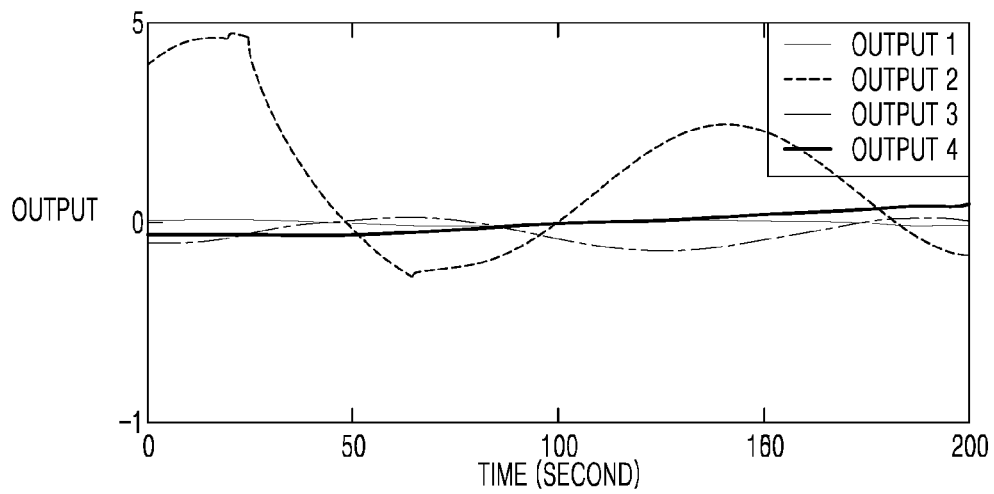
Figure 6C:
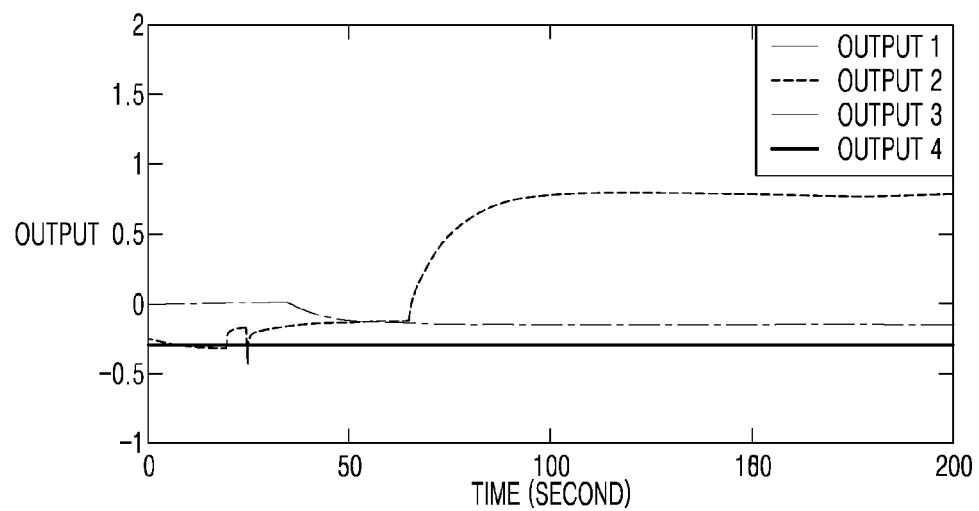
Figure 7A:
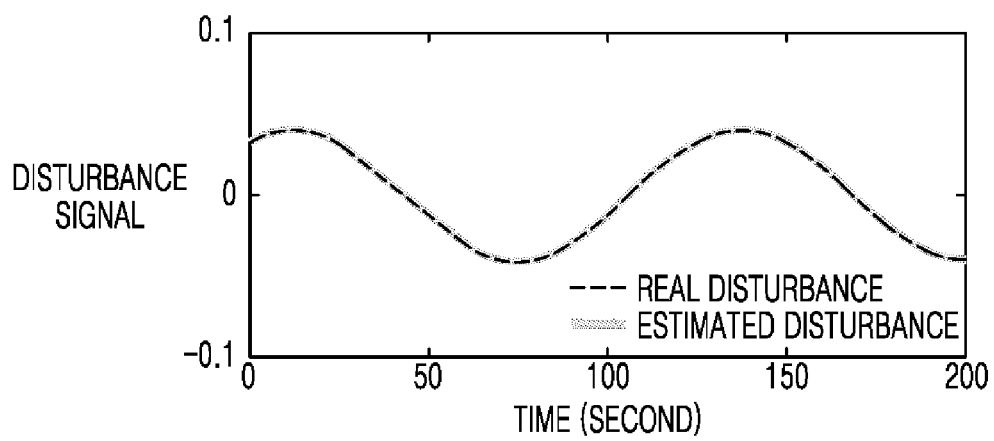
Figure 7B:
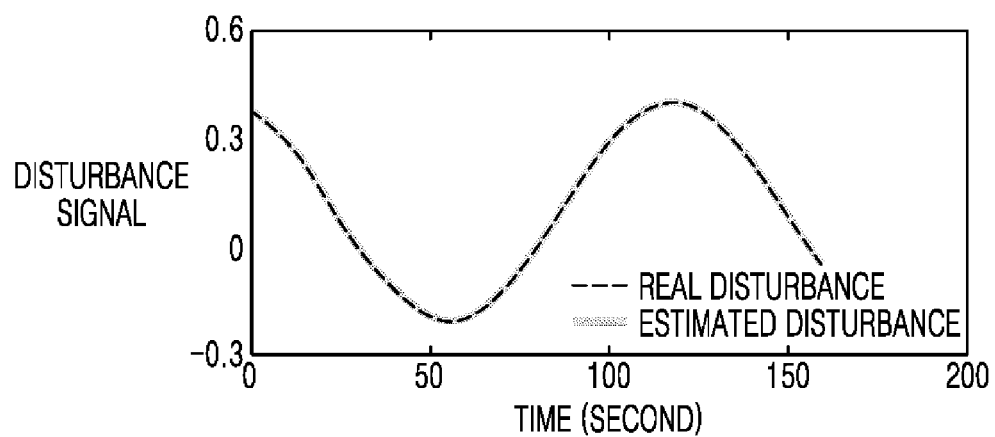
Figure 7C:
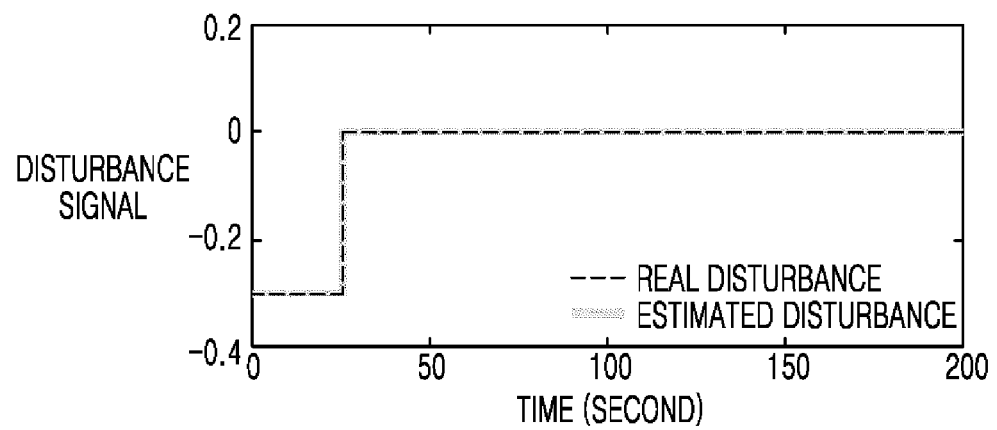
Figure 7D:
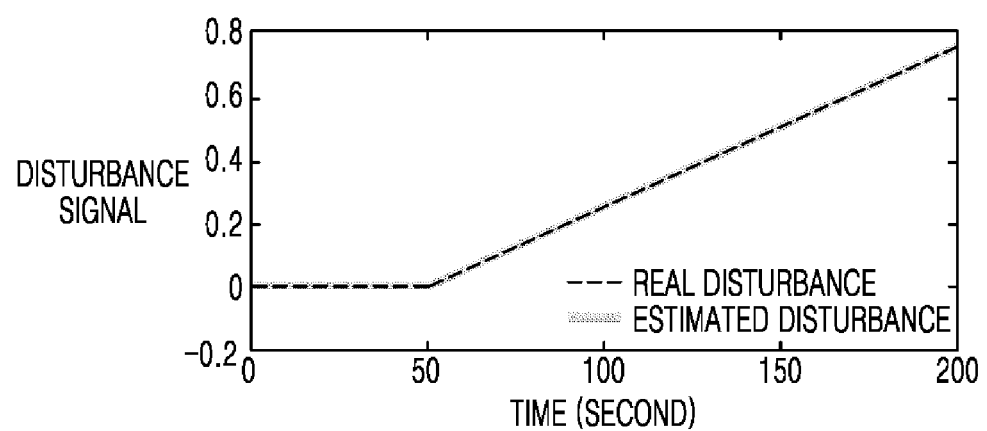

FIG. 6A illustrates the output for time of the control system (TCS) when no disturbance signal is generated, FIG. 6B illustrates the output for time of the control system (TCS) which cannot compensate for a disturbance signal when the disturbance signal is generated in a comparative example in which the result opposite to that of the embodiment of the present disclosure, and FIG. 6C illustrates the output for time of the control system (TCS) for compensating for the disturbance signal when the disturbance signal compensation device 200 according to an embodiment of the present disclosure is applied.

FIG. 6A to FIG. 6C illustrate that compensation for disturbance is properly performed by the disturbance signal compensation device 200 according to an embodiment of the present disclosure, using a Tennessee-Eastmann Process System (TEPS) on the basis of assumption that there is no time delay.

FIG. 7A to FIG. 7D illustrate that the disturbance signal compensation device 200 according to an embodiment of the present disclosure accurately estimates actually generated disturbance. As illustrated in the drawings, the disturbance signal compensation device 200 may accurately estimate actually generated disturbance regardless of a signal form.

FIG. 8 is a sequence diagram illustrating a method of estimating a disturbance signal flowing into the control system according to an embodiment of the present disclosure.

First, the disturbance signal estimation method may include step S710 of inputting input data (u) into the control system and acquiring output data.

Subsequently, the disturbance signal estimation method may include step S720 of estimating the input data (u) from the acquired output data on the basis of a system model matrix corresponding to an input/output relation model of the control system.

Thereafter, the disturbance signal estimation method may include step S730 of estimating the disturbance signal flowing into the control system on the basis of the estimated input data (û).

The disturbance signal estimation method may further include a step of generating the system model matrix before step S710 of acquiring the output data. Since the system model matrix has been described above, a description thereof is omitted herein.

Further, the disturbance signal estimation method may include a step of estimating the input data (u) on the basis of [Equation 1] and [Equation 2] above. Also, since the step has been described above, a description thereof is omitted herein.

The disturbance signal estimation method may include a step of estimating the disturbance signal by comparing the estimated input data (û) and initial input data ($u_c$) which is not influenced by disturbance in step S730 (step of estimating the disturbance signal).

The disturbance signal estimation method may include a step of reflecting subtraction of the estimated disturbance signal in the following input data to be applied in the control system after step S730 of estimating the disturbance signal.

The present disclosure can be implemented as a computer-readable code in a medium in which a program is recorded. The computer-readable medium includes all types of recording devices which store data readable by a computer system. For example, the computer-readable medium includes a Hard Disk Drive (HDD), a Solid-State Disk (SSD), a Silicon Disk Drive (SDD), ROM, RAM, a CD-ROM, a magnetic tape, a floppy disc, an optical data storage device, and the like, and also includes the processor 290 of the disturbance signal compensation device 100.

Although specific embodiments of the present disclosure have been descried and illustrated above, the present disclosure is not limited to the embodiments and those skilled in the art can understand that various modifications and changes to other detailed embodiments can be made without departing from the idea and scope of the present disclosure. Therefore, the scope of the present disclosure should be defined by the technical idea in the appended claims rather than by the above-described embodiments.

What is claimed is:

1. A method of estimating disturbance flowing into a control system, based on input/output data; the method comprising:
generating a system model matrix corresponding to an input/output relation model of the control system;
inputting input data (u) into the control system and acquiring output data;
estimating the input data (u) from the acquired output data, based on the system model matrix; and
estimating a disturbance signal flowing into the control system, based on the estimated input data (û), without application of a low pass filter,
wherein the system model matrix includes two reference sampling matrixes ($U_p$, $U_f$) obtained by dividing a series of input sampling data input into the control system according to a number of data, and two reference sampling matrixes ($Y_p$, $Y_f$) obtained by dividing a series of output sampling data output from the control system according to a number of data in accordance with the series of input sampling data,
wherein the estimating of the input data (u) comprises estimating the input data (u), based on [Equation 1] of $$\begin{bmatrix} Y_p \\ U_p \\ Y_f \end{bmatrix} g = \begin{bmatrix} y_{ini} \\ u_{ini} \\ y \end{bmatrix}$$

and [Equation 2] of $U_f g = \hat{u}$, and
wherein g denotes a variable derived by [Equation 1], $u_{ini}$ denotes an additional input data matrix, $y_{ini}$ denotes an additional output data matrix, y denotes acquired output data, and û denotes estimated input data.

2. The method of claim 1, wherein the estimating of the disturbance signal comprises estimating the disturbance signal by comparing the estimated input data (û) and initial input data ($u_c$) that is not influenced by disturbance.

3. The method of claim 2, further comprising, after the estimating of the disturbance signal, reflecting subtraction of the estimated disturbance signal in next input data to be applied in the control system.

4. An apparatus for estimating disturbance flowing into a control system, based on input/output data, the apparatus comprising:
a generator configured to generate a system model matrix corresponding to an input/output relation model of the control system;
an input unit; and
an estimator configured to, when input data (u) is provided to the control system through the input unit and thus output data is acquired, estimate the input data (u) from the acquired output data, based on the system model matrix,
wherein the estimator is configured to estimate a disturbance signal flowing into the control system, based on the estimated input data (û), without application of a low pass filter,
wherein the system model matrix includes two reference sampling matrixes ($U_p$, $U_f$) obtained by dividing a series of input sampling data input into the control system according to a number of data, and two reference sampling matrixes ($Y_p$, $Y_f$) obtained by dividing a series of output sampling data output from the control system according to a number of data in accordance with the series of input sampling data,
wherein the estimator is configured to estimate the input data (u), based on [Equation 3] of $$\begin{bmatrix} Y_p \\ U_p \\ Y_f \end{bmatrix} g = \begin{bmatrix} y_{ini} \\ u_{ini} \\ y \end{bmatrix}$$

and [Equation 4] of $U_f g = \hat{u}$, and
wherein g denotes a variable derived by [Equation 3], $u_{ini}$ denotes an additional input data matrix, $y_{ini}$ denotes an additional output data matrix, y denotes acquired output data, and û denotes estimated input data.

5. The apparatus of claim 4, wherein the estimator is configured to estimate the disturbance signal by comparing the estimated input data (û) and initial input data ($u_c$) that is not influenced by disturbance.

6. An apparatus for compensating for disturbance flowing into a control system, based on input/output data, the apparatus comprising:

a generator configured to generate the system model matrix corresponding to an input/output relation model of the control system;

an input unit;

an estimator configured to, when input data (u) is provided to the control system through the input unit and thus output data is acquired, estimate the input data (a) from the acquired output data, based on the system model matrix corresponding to an input/output relation model of the control system; and at least one processor, wherein the estimator is configured to estimate a disturbance signal flowing into the control system, based on the estimated input data (û), without application of a low pass filter, wherein the processor is configured to control the input unit to reflect subtraction of the estimated disturbance signal in next input data of the control system, wherein the system model matrix includes two reference sampling matrixes ($U_p$, $U_f$) obtained by dividing a series of input sampling data input into the control system according to a number of data, and two reference sampling matrixes ($Y_p$, $Y_f$) obtained by dividing a series of output sampling data output from the control system according to a number of data in accordance with the series of input sampling data, wherein the estimator is configured to estimate the input data (u), based on [Equation 5] of $$\begin{bmatrix} Y_p \\ U_p \\ Y_f \end{bmatrix} g = \begin{bmatrix} y_{ini} \\ u_{ini} \\ y \end{bmatrix}$$

and [Equation 6] of $U_f g = \hat{u}$, and wherein g denotes a predetermined variable and is derived by [Equation 5], $u_{ini}$ denotes an additional input data matrix, $y_{ini}$ denotes an additional output data matrix, y denotes acquired output data, and û denotes estimated input data.

7. The apparatus of claim 6, further comprising a mode switch configured to change a first mode in which a disturbance signal is estimated and a second mode in which the estimated signal is compensated for, wherein the processor is configured to control the mode switch to operate in the second mode when the disturbance signal is generated in the first mode.

8. The apparatus of claim 6, wherein the estimator is configured to estimate the disturbance signal by comparing the estimated input data (û) and initial input data ($u_c$) that is not influenced by disturbance.

* * * * *